(No Model.) 2 Sheets—Sheet 1.
L. H. WHITNEY.
Silo.
No. 240,485. Patented April 19, 1881.
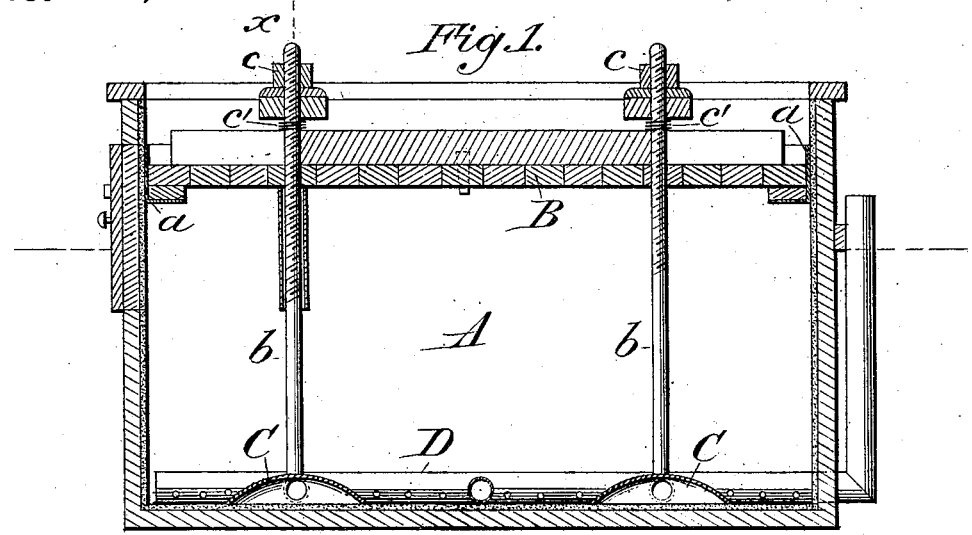
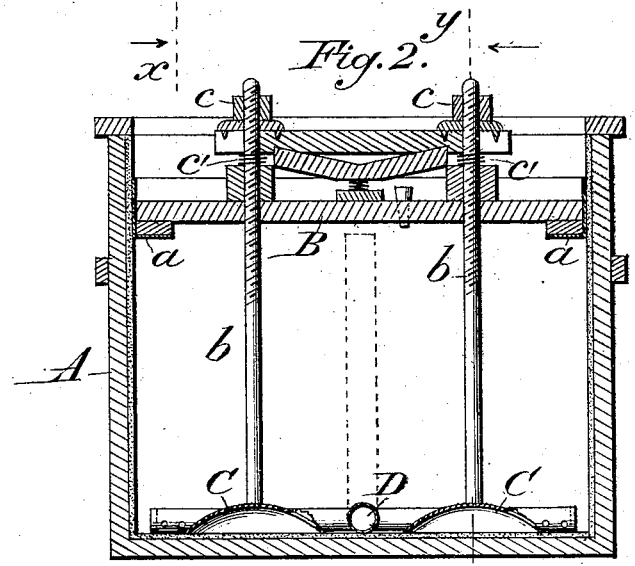
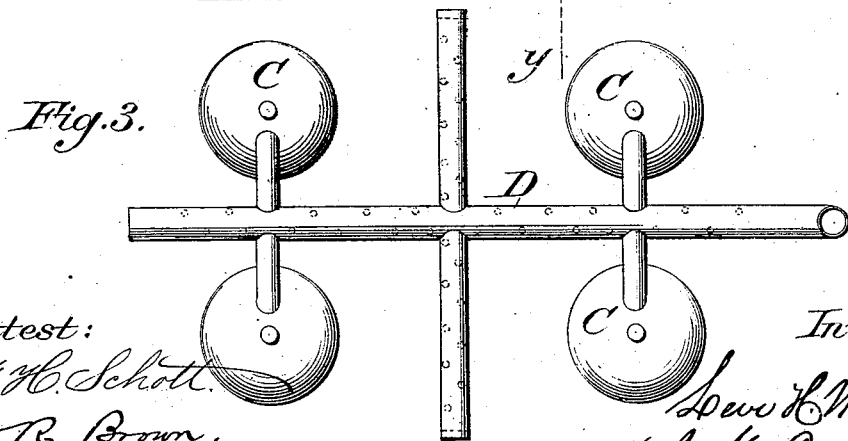
Attest:
F. H. Schott
A. R. Brown.
Inventor:
Lew H. Whitney (No Model.)
L. H. WHITNEY.
Silo.
No. 240,485.
2 Sheets—Sheet 2.
Patented April 19, 1881.
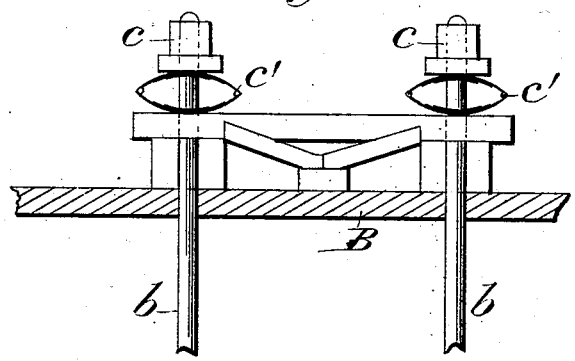
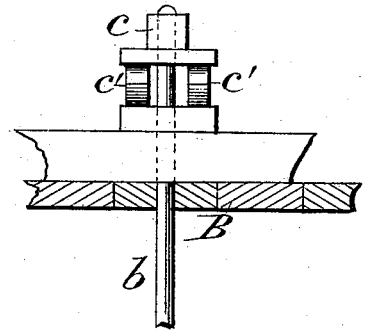
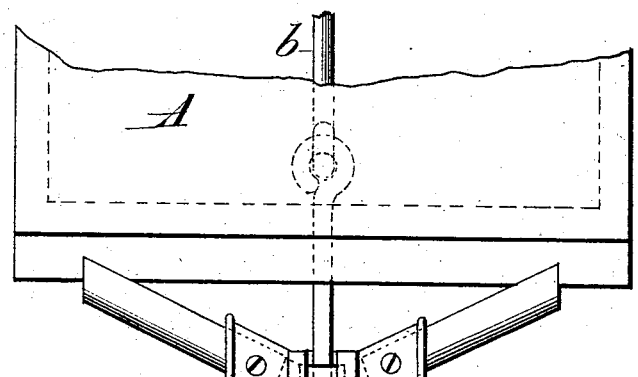
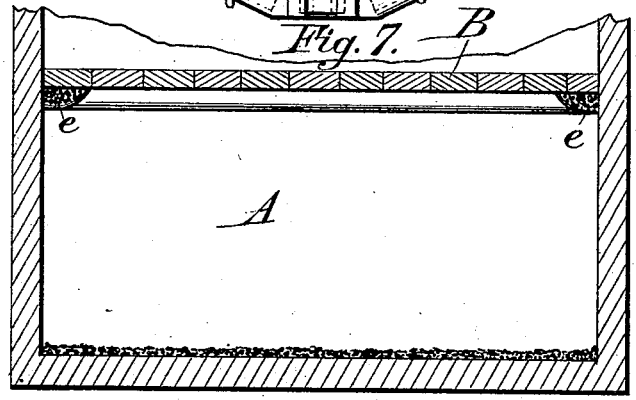
Attest:
F. H. Schott.
A. R. Brown.
Inventor:
Levi H. Whitney
per J. C. Tasker atty

UNITED STATES PATENT OFFICE.

LEVI H. WHITNEY, OF LOWELL, MASSACHUSETTS, ASSIGNOR OF ONE-HALF TO JOHN C. TASKER, OF WASHINGTON, DISTRICT OF COLUMBIA.

SILO.

SPECIFICATION forming part of Letters Patent No. 240,485, dated April 19, 1881.

Application filed March 17, 1881. (No model.)

*To all whom it may concern:*

Be it known that I, LEVI H. WHITNEY, a citizen of the United States, residing at Lowell, in the county of Middlesex and State of Massachusetts, have invented certain new and useful Improvements in Silos; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to the construction and operative mechanism of that class of food-receptacles, commonly called "silos," which are employed for the storage and preservation of green forage.

As heretofore constructed, these food-receptacles have been very difficult to build and operate, as well as unsatisfactory in their results, as it frequently happened that, owing to the exposure of some part of the inclosed ensilage to contact with atmospheric air through imperfections in the structure, or from an insufficient pressure being applied, owing to the crude appliances provided for applying it, to force out the gases engendered in the mass, fermentation has set in and the contents of the silo been greatly injured or rendered wholly useless.

In order to avoid these disastrous results I have devised the improvements in their construction and the means for operating them successfully which will be described hereinafter.

In the accompanying drawings, Figure 1 is a vertical longitudinal section through the silo, showing the general construction and arrangement of the several parts. Fig. 2 is a transverse vertical section on the line *x x* of Fig. 1. Fig. 3 is a plan showing the arrangement of the suckers to which the holding-down bolts are attached, and the system of exhaust-pipes through which the air is drawn from beneath the suckers, and air and gases removed from the ensilage. Figs. 4 and 5 are views showing one method of placing the springs beneath the nuts used for compressing the ensilage. Fig. 6 shows a modification of the means used for holding the bolts by which the ensilage is compressed. Fig. 7 is a vertical section showing a silo provided with a layer of charcoal on its bottom, and a receptacle for the same substance attached to the under side of the cover and extending entirely around the same.

These silos may be built in any of the various ways now in use, either of brick or stone or wood, with a concrete or cement lining, and may be either rectangular, octagonal, or circular in plan, according to the wishes of the constructor, each form having its peculiar advantages, as when the receptacle is formed partly or wholly beneath the surface of the earth, and such earth is of a yielding nature, likely to press against the sides. The circular form will best resist such pressure, the octagonal coming next, which may be advantageous when the structure is of wood; but when it is in hard ground, which will itself assist in supporting the sides in proper form, the rectangular is generally preferred.

A represents the walls of the structure, and B its movable cover, which may be formed in several pieces, to be taken apart when it is desired to remove it, but is preferably in a single piece, loosely fitting the interior of the receptacle, proper appliances being arranged above it to hoist it out and hold it suspended above the receptacle while the latter is being filled. The edges of this cover are provided with a suitable packing-strip, *a*, which prevents the entrance of air through the space between the cover and sides of the receptacle. As it is found necessary to force down this cover with very great pressure upon the inclosed ensilage, I employ a system of holding-down bolts, *b b*, in number to suit the size of the silo, the lower ends of which are secured in a suitable manner, while their upper ends, which pass through the cover, are screw-threaded and provided with nuts *c c*, by the turning of which the cover is forced down.

Experience has demonstrated the fact that the force applied to the cover should be continuous, and not intermittent, as would be the case if the nuts *c* were turned down directly upon the cover-bearings, as the attendant cannot be continually at his post, wrench in hand, to turn the nuts. Attempts have been made to obviate this difficulty by loading the cover with several tons of stone or other weights, but this involved great labor, although, when the load was properly applied, good results, so far as the preservation of the ensilage was concerned, were produced.

In order to secure these beneficial results without greatly increasing the cost of the apparatus, I place between the nuts and their bearing upon the cover a series of springs, $c'\ c'$, which may be coiled spirally around the rods $b$, as shown in Fig. 1, or may consist of two elliptic springs for each rod, arranged as shown in Figs. 4 and 5 of the drawings. The latter arrangement is preferred, as giving a greater range of spring for the space occupied; but methods of constructing and arranging the springs may be devised without departing from the spirit of this part of my invention, which consists, broadly, in applying a yielding pressure to the cover by means of springs, so placed as to produce that result.

In silos already constructed great difficulty is sometimes experienced, when it is desired to apply my apparatus thereto, in obtaining proper anchorage for the bolts $b$, as it was impossible to get beneath them to arrange the needed appliances.

In order to overcome this difficulty I have devised the following means: C C are circular disks, of a proper diameter and slightly concave, which are attached to the lower ends of the bolts $b$. These disks are provided with a layer of leather or other suitable packing material around their peripheries, upon the under side, so that when placed upon the bottom of the silo they shall form an air-tight joint thereon. It will therefore be apparent that if the air were exhausted from beneath these disks they would be held down upon the bottom of the silo with a force equal to the pressure caused by the exhaustion added to the weight of the superincumbent mass of ensilage and its cover.

In order to exhaust the air from beneath the disks, as well as the air and gases among the ensilage, I employ a perforated pipe, D, lying upon the floor of the silo, and connected by branches with each of the disks. This pipe may be carried out through the walls or floor of the silo at any convenient point and connected to any suitable exhausting apparatus.

It will be evident that the use of these devices will greatly lessen the pressure needed to retain the ensilage in a perfect condition, as by the instant removal of all gases as soon as formed there is no tendency toward fermentation, and the weight of the atmospere upon the cover, together with the compression produced by the screws, reduces the contents of the silo nearly to the condition of a solid.

Experience teaches us that charcoal is one of the best antiseptics, owing to its absorbent qualities, and I have found it beneficial to cover the floor of the silo, before the introduction of the ensilage, with a layer of charcoal, and also to provide a suitable receptacle for a quantity of the same material to be attached to the under side of the cover adjacent to the joint around the same, between it and the walls of the silo, as shown at $e\ e$ in Fig. 7 of the drawings. It has also been found to be of benefit to wash the interior of the silo, before the introduction of its contents, with a solution of resorcine, which, by destroying the spores that would produce fermentation, aids in securing the desired result.

Having thus described my invention, I claim as new, and desire to secure by Letters Patent, the following:

1. In an apparatus for preserving ensilage, the combination, with the ensilage-receptacle, of a movable cover and means for forcing said cover down upon the contents of the receptacle with a yielding pressure, substantially as specified.

2. The combination, with the holding-down bolts of a silo and its cover, of the nuts $c$ and springs $c'$, arranged and operating as shown and described.

3. The holding-down bolts $b$, provided with disk-anchors for securing them to the bottom of the silo, as set forth.

4. The combination of the disk-anchors with the exhaust-pipes, as and for the purpose specified.

5. The combination, with a silo, of the exhaust apparatus for removing air and gases therefrom, as set forth.

6. The combination, with a silo, of the charcoal-receptacle $e$, arranged as shown and described, for the interception and absorption of deleterious gases, the bottom of said silo being provided with a layer of charcoal, as and for the purposes set forth.

7. As an improvement in the art of preserving ensilage, the coating of the interior of the silo with resorcine, before the same is filled, for the purpose of destroying the spores or germs of fermentation, as set forth.

In testimony whereof I affix my signature in presence of two witnesses.

LEVI H. WHITNEY.

Witnesses:
CHARLES R. BLAISDELL,
E. L. WHITNEY.